(12) United States Patent
Matsunami et al.

(10) Patent No.: US 7,216,148 B2
(45) Date of Patent: May 8, 2007

(54) STORAGE SYSTEM HAVING A PLURALITY OF CONTROLLERS

(75) Inventors: Naoto Matsunami, Tokyo (JP); Ikuya Yagisawa, Tokyo (JP); Manabu Kitamura, Tokyo (JP); Yoshiki Kano, Tokyo (JP); Kenichi Takamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 733 days.

(21) Appl. No.: 09/999,826

(22) Filed: Oct. 30, 2001

(65) Prior Publication Data

US 2003/0023665 A1 Jan. 30, 2003

(30) Foreign Application Priority Data

Jul. 27, 2001 (JP) .............................. 2001-226982

(51) Int. Cl.
G06F 15/167 (2006.01)
(52) U.S. Cl. .................. 709/216; 709/208; 711/111; 711/156
(58) Field of Classification Search ........ 709/208–209, 709/211, 216; 711/111, 112, 114, 154, 156
See application file for complete search history.

(56) References Cited

U.S. PATENT DOCUMENTS

| | | | | |
|---|---|---|---|---|
| 5,548,724 A | * | 8/1996 | Akizawa et al. ............. | 709/203 |
| 5,768,623 A | | 6/1998 | Judd et al. | |
| 5,802,366 A | * | 9/1998 | Row et al. ................... | 709/250 |
| 5,917,489 A | * | 6/1999 | Thurlow et al. ............. | 709/207 |
| 5,991,804 A | * | 11/1999 | Bolosky et al. ............. | 709/221 |
| 6,157,963 A | | 12/2000 | Courtright et al. | |
| 6,438,646 B1 | | 8/2002 | Kitamura et al. | |
| 6,460,113 B1 | | 10/2002 | Schubert et al. | |
| 6,493,804 B1 | * | 12/2002 | Soltis et al. ................. | 711/152 |
| 6,542,954 B1 | | 4/2003 | Aruga | |
| 6,606,690 B2 | * | 8/2003 | Padovano .................... | 711/148 |

(Continued)

FOREIGN PATENT DOCUMENTS

EP 1100001 A 5/2001

(Continued)

OTHER PUBLICATIONS

Drapeau et al. "High-Bandwidth Network File Server," IEEE Proceedings of the 21st Annual International Symposium on Computer Architecture, pp. 234-244 (1994).

(Continued)

Primary Examiner—Ario Etienne
Assistant Examiner—Phuoc H Nguyen
(74) Attorney, Agent, or Firm—Townsend and Townsend and Crew LLP

(57) ABSTRACT

A storage system having a plurality of disk controllers for accepting computer access through a SAN, and a plurality of file servers for accepting computer access through a LAN. The disk controllers and file servers are connected through a connection unit to a plurality of disk drive units in a disk pool. A disk pool management unit manages the relationships between the disk controllers and file servers and the disk drive units used by the respective disk controllers and file servers, and sends information identifying the usable disk drive units to the respective disk controllers and file servers. The disk controllers and file servers use the disk drive units based on the received usable disk information.

7 Claims, 13 Drawing Sheets

U.S. PATENT DOCUMENTS

| | | | |
|---|---|---|---|
| 6,640,278 B1* | 10/2003 | Nolan et al. | 711/6 |
| 6,671,776 B1* | 12/2003 | DeKoning | 711/114 |
| 6,732,104 B1* | 5/2004 | Weber | 709/229 |
| 6,732,117 B1 | 5/2004 | Chilton | |
| 6,742,034 B1 | 5/2004 | Schubert et al. | |
| 6,961,749 B1 | 11/2005 | Kleiman | |
| 2001/0052073 A1 | 12/2001 | Kern et al. | |
| 2002/0023195 A1 | 2/2002 | Okada | |
| 2002/0152339 A1 | 10/2002 | Yamamoto | |

FOREIGN PATENT DOCUMENTS

| | | |
|---|---|---|
| JP | 9-81527 | 3/1997 |
| JP | 2000-348005 | 12/2000 |

OTHER PUBLICATIONS

Tomita et al. "A scalable, cost-effective, and flexible disk system using high-performance embedded-processors," IEEE Proceedings of the 2000 International Conference on Parallel Processing, pp. 317-326 (Aug. 2000).

* cited by examiner

FIG.8

| PATH ID 5201 | ADDRESS 5202 | DISK CAPACITY 5203 | USED-CONTROLLER IDENTIFICATION NUMBER 5204 | STATUS 5205 |
|---|---|---|---|---|
| 0 | 0 | 36GB | ARRAY500A1234 | NORMAL |
| 0 | 1 | 36GB | ARRAY500A1234 | NORMAL |
| 0 | 2 | 36GB | FSVR100B0013 | NORMAL |
| ⋮ | ⋮ | ⋮ | ⋮ | ⋮ |

FIG.10

| ADDRESS 5241 | USED-CONTROLLER IDENTIFICATION NUMBER 5242 | CONTROLLER TYPE 5243 | STATUS 5244 |
|---|---|---|---|
| 0 | FSVR100B0013 | FILE SERVER | NORMAL |
| 1 | ARRAY500A1234 | DISK ARRAY CONTROLLER | NORMAL |
| 2 | FSVR100B0059 | FILE SERVER | NORMAL |
| 3 | ARRAY500A2199 | DISK ARRAY CONTROLLER | NORMAL |
| 4 | FSVR100B0153 | FILE SERVER | NORMAL |
| 5 | ARRAY500A1898 | DISK ARRAY CONTROLLER | NORMAL |
| 6 | ARRAY500A1936 | DISK ARRAY CONTROLLER | NORMAL |

STORAGE SYSTEM HAVING A PLURALITY OF CONTROLLERS

BACKGROUND OF THE INVENTION

1. Field of the Invention

The present invention relates generally to a storage system for use with a computer system, and relates more particularly to a storage system having multiple types of input/output interfaces.

2. Description of Related Art

There are two general types of interfaces ("I/F" below) used in computer systems to connect storage devices to the computer. The first type is the block I/O interface, which uses the data management unit of the storage device, the data block, as the unit for input/output ("I/O" below) access. The block I/O interface includes a fibre channel, SCSI (small computer systems interface), or other interface. The second type is the file I/O interface, which uses file units for I/O access. The file I/O interface is used with the network file system (NFS), common Internet file system (CIFS), and other file systems that use data from storage devices managed by a file server connected via a network.

Techniques for interconnecting a plurality of storage devices via a network can also be grouped in two categories based on the differences in the interfaces described above. The first is a Storage Area Network (SAN), a network for connecting to storage devices by connecting computers and storage devices using a fibre channel. The second is a Network-Attached Storage (NAS), a method for accessing storage devices with the file I/O interface by connecting the storage devices to a local area network (LAN) such as commonly used for communication between computers.

The SAN uses a high speed network that is dedicated to storage and is separate from the network used for sending messages between computers. Compared with NAS systems having the storage devices connected via a LAN, SAN systems enable faster data transfers. Protocol overhead is also small and fast response can be achieved with SAN systems because the block I/O interface is used. The disadvantage to SAN systems is that setup costs are high because a dedicated network is required. SAN is therefore used primarily in the backbone system of corporate computer networks, frequently for database applications.

With NAS the storage system is connected directly to the LAN. Setup costs are low and setup is relatively easy because an existing LAN can be used. A standardized NFS, CIFS, or other network file system is also used for the interface, and data is managed in file units. Data management is therefore easy, and files can be easily shared between plural computers. The disadvantage to NAS is that because the storage system is accessed via the same LAN used for communication between computers, LAN traffic (load) is increased. The processing overhead of a network file system is also high, and response is slower than with block I/O. For these reasons NAS is used primarily for corporate file management systems, Web content management, CAD data file management, and other such applications.

As will be known from the above, NAS and SAN are mutually complementary and are used for different purposes. NAS and SAN are therefore generally used for appropriate applications.

Technology for combining SAN and NAS is also known from the prior art as described below.

A computer is connected to a storage system through a file server connected to a LAN, or the computer and file server are connected directly to the storage system via a SAN. The file server is connected to the storage system through a fibre channel or other interface. The storage system used in this case is typically a disk array system having a plurality of disk drive units and a disk controller located between the plural disk drive units and the computers for controlling data access to the disk drive units.

To access data stored on the storage system, a computer connected only to the file server accesses files in the storage system via the file server using the NFS, CIFS, or other protocol. Computers connected to both the file server and SAN must send a request to the file server in order to access the storage system, but data is transferred from the storage system to the computer directly over the SAN.

It will be noted that with this prior art method a NAS system is created by the file server and the storage system connected to the file server by a fibre channel. In other words, this prior art technology creates a NAS system above the SAN.

SUMMARY OF THE INVENTION

The prior art technology described above enables SAN and NAS systems to be used together. However, because the NAS system is attached on the storage system as an upper level system for the storage system, the processing overhead of the storage system is added to the processing overhead of the NAS file server. Overhead is thus greater than when a NAS system is used alone.

Furthermore, while the file server determines the logical storing location of a particular file, the storage system determines the physical storing location of the file in the storage system. The file server therefore cannot control data allocation so as to optimize the physical data allocation of files in the storage system, and system performance is thus limited.

Yet further, even if only a NAS system is used, the above prior art technology requires a computer for the file server in addition to the storage system, thus increasing the initial cost. System expansion is also limited by the configuration of the storage system used.

It is therefore an object of this invention to provide a storage system enabling a NAS system and SAN to coexist while also increasing the freedom of system configuration design.

To achieve this object, a storage system according to the present invention has a plurality of disk drive units; a disk controller for receiving access requests from a computer by way of a block I/O interface and controlling access to the disk drive units; a file server for receiving access requests from a computer by way of a file I/O interface and controlling access to the disk drive units; and a connection unit connected between the disk controller, file server, and plural disk drive units for connecting the disk controller and file server to the plural disk drive units.

In a preferred embodiment of the invention the disk controller stores information for accessing the disk drive unit allocated to the disk controller, and the file server stores information for accessing the disk drive unit allocated to the file server, the disk drive units being allocated from among the plurality of disk drive units.

A storage system according to a further aspect of the invention has a disk controller having a fibre channel controller for connecting a computer via a fibre channel; a file server having a network controller for connecting a computer via a LAN; and a plurality of disk drive units used by the disk controller and file server for storing data used by the computer. This storage system preferably includes a management unit for managing allocation of the plural disk drive units to the disk controller and file server. For each disk drive unit, the management unit stores information describing the correlation between the disk drive unit and the disk controller or file server to which the disk drive unit is allocated. The management unit reports this information to the disk controller and file server. Each disk controller and file server knows from this information disk drive units the disk controller or file server can use, and uses the disk drive units accordingly.

BRIEF DESCRIPTION OF THE DRAWINGS

FIG. 8 is a table schematically showing the configuration of a disk pool management table;

FIG. 10 is a table schematically showing the configuration of a controller management table;

DESCRIPTION OF THE PREFERRED EMBODIMENTS

Figure 1:
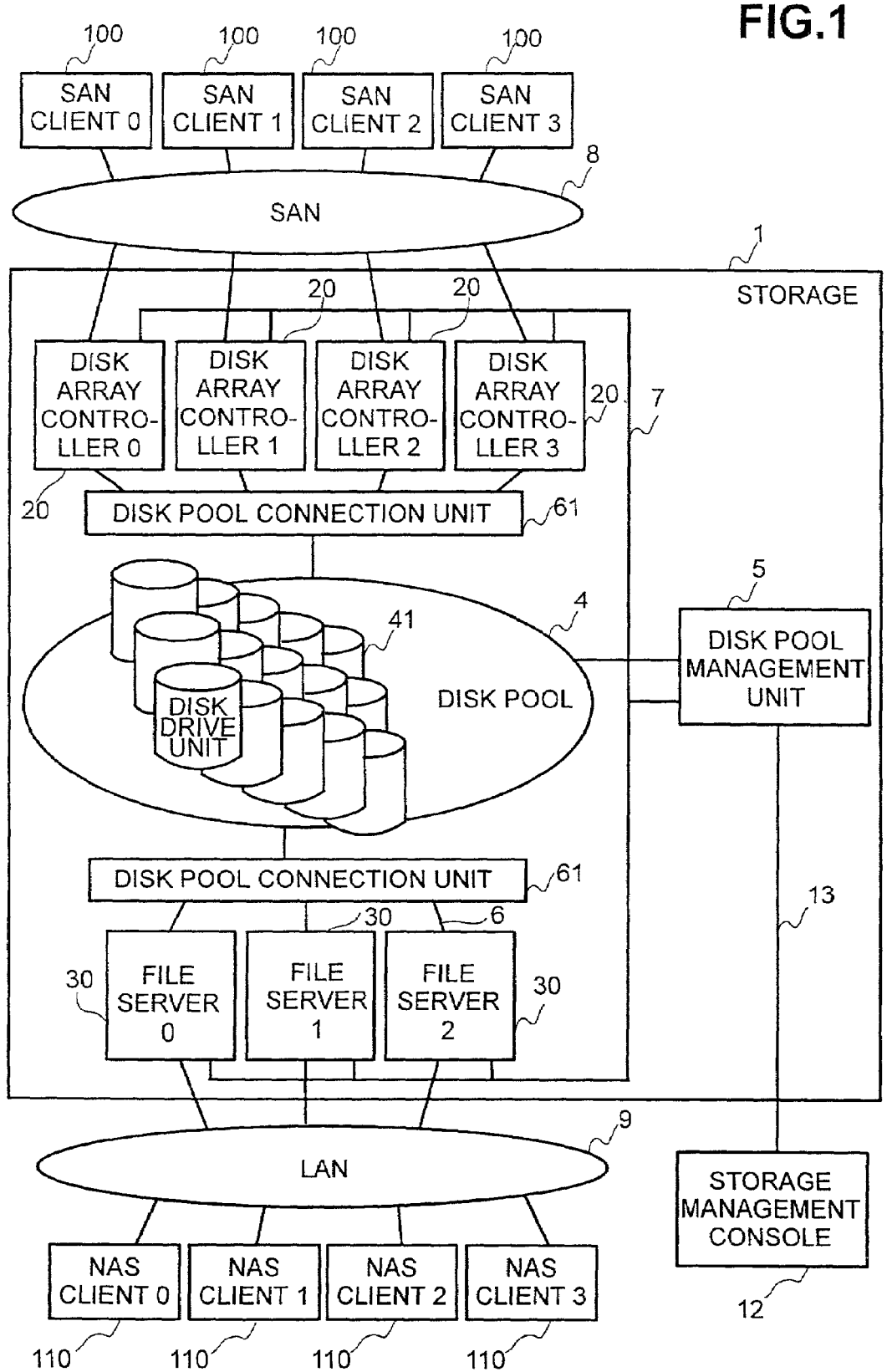
FIG. 1 is a simplified block diagram showing the configuration of a computer system in a first embodiment of the invention.

FIG. 1 is a simplified block diagram showing the configuration of a computer system in a preferred embodiment of the invention.

In this preferred embodiment of the invention the storage system 1 (also referred to below as simply "storage") is connected by way of a fibre channel Storage Area Network (SAN) 8 to a plurality of SAN clients 100, and by way of a local area network (LAN) to a plurality of NAS clients 110. Each SAN client 100 is a computer such as generally called a personal computer or server computer, and accesses the storage 1 through a block I/O interface. The NAS clients 110 are likewise a personal computer, server, or other such computer, but access the storage 1 through a file I/O interface.

The storage 1 is also connected to a storage management console 12 via a management LAN 13 for management. The storage management console 12 is used to monitor and configure the storage 1 by the user.

The storage 1 consists of a plurality of disk array controllers 20, a plurality of file servers 30, a plurality of disk drive units 41, a disk pool management unit 5, and a disk pool connection unit 61. The disk pool management unit 5 manages the storage area of a set of plural disk drive units 41 as a single large storage area called a disk pool 4. The disk drive units 41 in the disk pool 4 are also referred to as Just Bunch Of Disks (JBOD).

The disk array controllers 20, file servers 30 and disk pool management unit 5 are connected and communicate with each other via a management network 7. The disk array controllers 20 and file servers 30 are also connected through the disk pool connection unit 61 to the disk drive units 41 of the disk pool 4. In this preferred embodiment of the invention the disk array controllers 20 and disk pool connection unit 61, and the file servers 30 and disk pool connection unit 61, are connected through a fibre channel. The disk pool connection unit 61, disk pool management unit 5, and disk drive units 41 of the disk pool 4 are connected through a fibre channel disk pool connection network.

Figure 2:
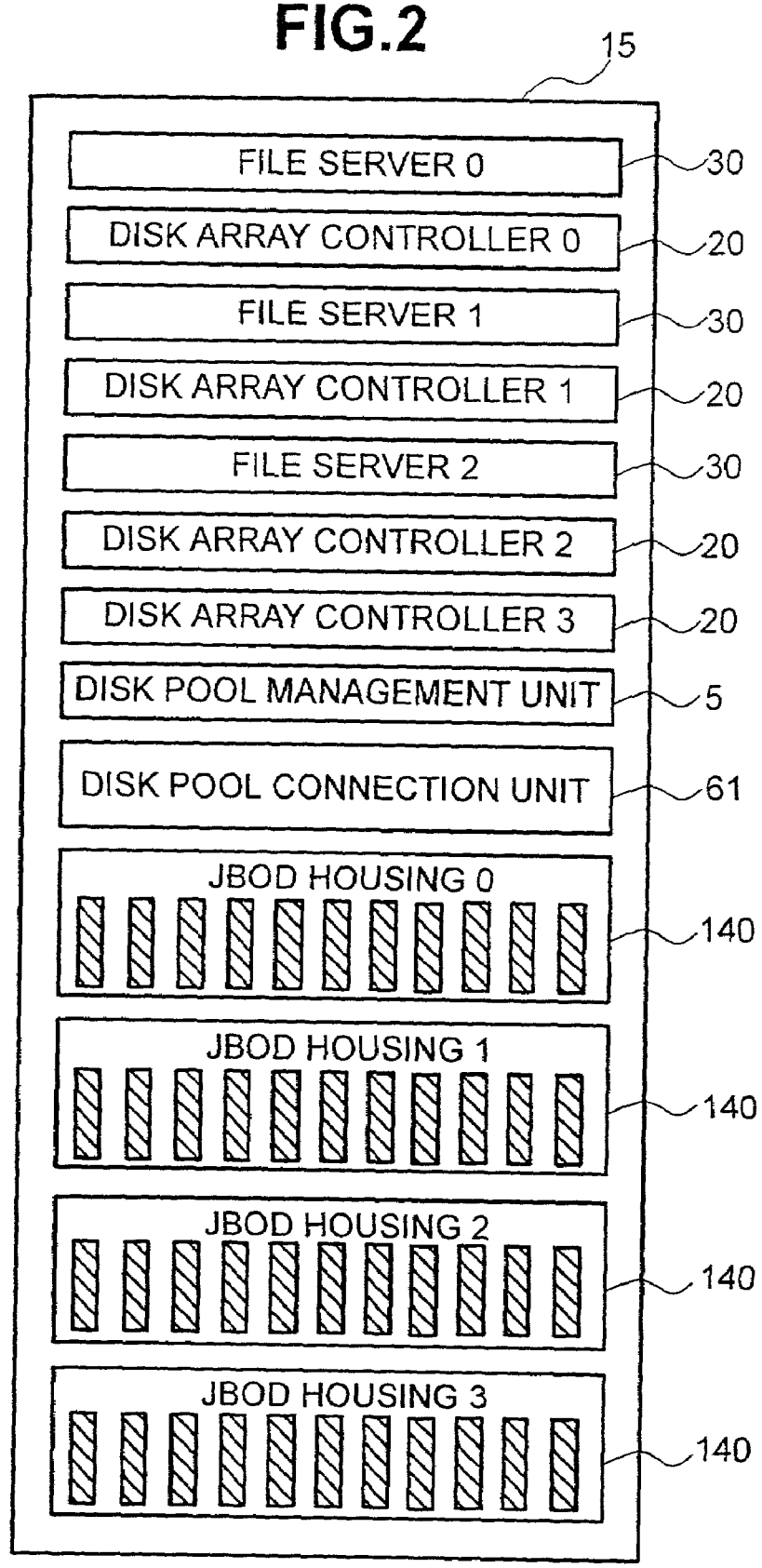
FIG. 2 is a schematic illustration showing the structure of a storage device.

FIG. 2 shows the components of the storage 1.

The storage 1 has the disk array controllers 20, file servers 30, disk pool management unit 5, disk pool connection unit 61, and JBOD enclosure 140 components mounted in a rack 15. The rack 15 typically is 19 inches wide with slots for holding the various components. Each slot preferably has a height equal to an integer multiple of the unit thickness of the components. Each of the JBOD enclosures 140 has plural slots for housing plural disk drive units 41 of the disk pool 4. It will obvious that all of the components do not need to be housed in a single rack 15, and the components can be distributed to plural racks 15.

Figure 3:
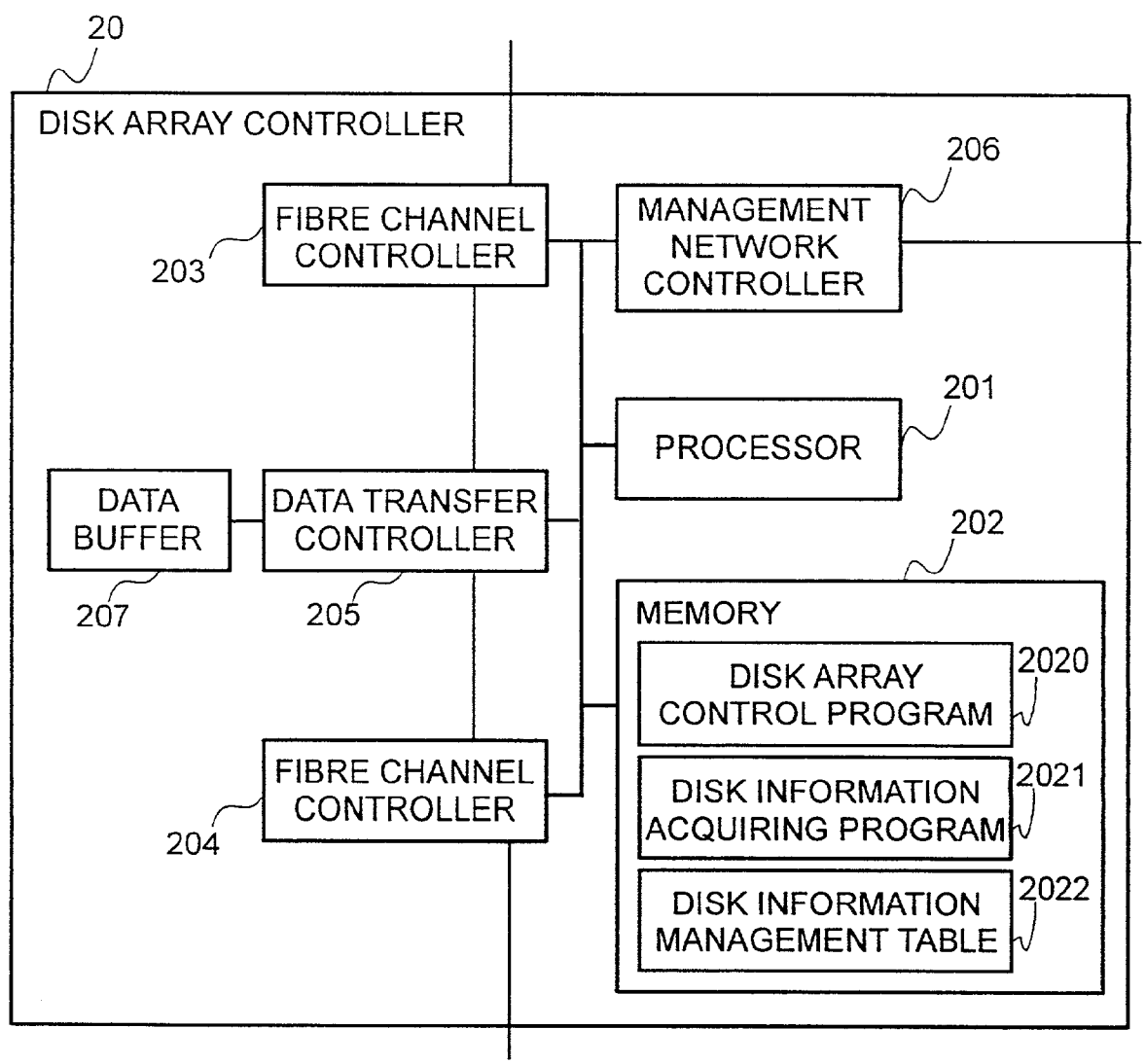
FIG. 3 is a simplified block diagram showing the configuration of a disk array controller.

FIG. 3 is a block diagram showing the configuration of a disk array controller 20.

Each disk array controller 20 has a processor 201 providing overall control of the disk array controller, memory 202 for storing control data and the control program run by the processor 201, a fibre channel controller 203 for connecting the disk array controller 20 to the SAN 8, a fibre channel controller 204 for connecting to the disk pool 4, a data transfer controller 205 for controlling data transfers between fibre channel controllers 203 and 204, a management network controller 206 for connecting to the management network 7, and a data buffer 207 used as a data cache and for regulating the data transfer rate between the computer and disk drive units.

The memory 202 stores a disk array control program 2020 as the control program, and a disk information acquiring program 2021 for acquiring disk information identifying the disk drive unit used by the disk array controller 20 from the disk pool management unit 5. The memory 202 also stores a disk information management table 2022 holding the acquired disk information.

Figure 4:
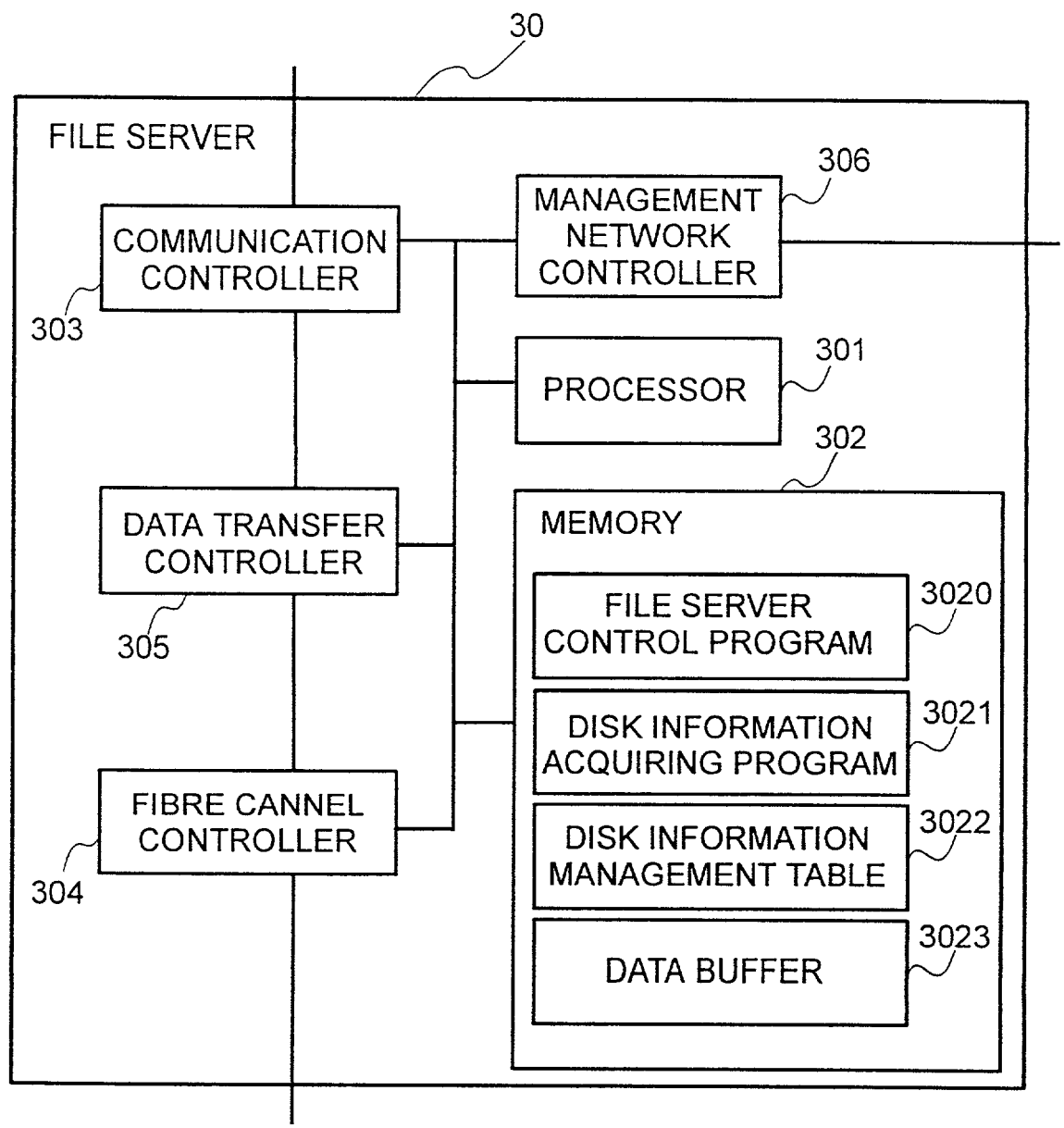
FIG. 4 is a simplified block diagram showing the configuration of a file server.

FIG. 4 is a simplified block diagram of a file server 30.

Each file server 30 has a processor 301 providing overall control of the file server 30, memory 302 for storing control data and the control program run by the processor 301, a communication controller 303 for connecting to the LAN 9, a fibre channel controller 304 for connecting to the disk pool 4, a data transfer controller 305 for controlling data transfers between the communication controller 303 and fibre channel controller 304, and a management network controller 306 for connecting to the management network 7.

The memory 302 stores a file server control program 3020 as the control program, and a disk information acquiring program 3021 for acquiring information (referred to below as the usable disk information) identifying the disk drive unit 41 used by the file server 30 from the disk pool management unit 5. The memory 302 also stores a disk information management table 3022 holding the acquired usable disk information. In addition, the memory 302 has a data buffer 3023 used as a data cache and for adjusting the data transfer rate between the computer and disk drive unit 41.

Figure 5:
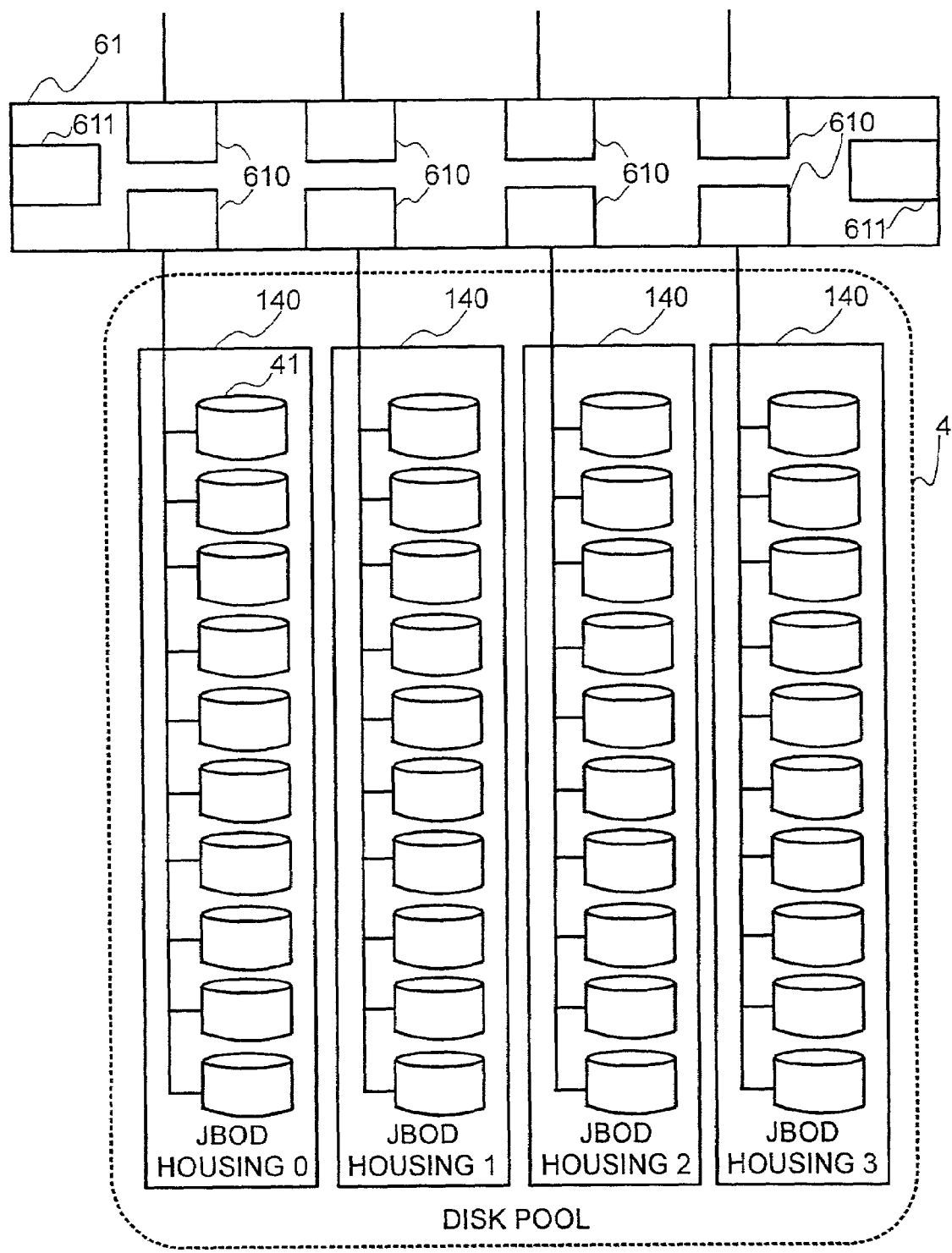
FIG. 5 is a simplified block diagram showing the configuration of a disk pool and disk pool connection unit.

FIG. 5 is a simplified block diagram showing the configuration of the disk pool 4 and disk pool connection unit 61.

The disk pool 4 is a plurality of disk drive units 41 housed in a plurality of JBOD enclosures 140. The number of disk drive units 41 is optional and can be increased or decreased as necessary. Furthermore, while four JBOD enclosures 140 are shown in FIG. 5, this number can also be changed as needed. The disk drive units 41 are connected in loops in the JBOD enclosures 140.

The disk pool connection unit 61 has a plurality of connection ports 610 and a plurality of expansion ports 611. A desired number of disk array controllers 20, file servers 30, and JBOD enclosures 140 can be connected to each connection port 610. This embodiment of the invention also enables another disk pool connection unit to be connected to an expansion port 611 as needed such that plural disk pool connection units 61 are cascaded.

The number of ports can thus be increased as desired by appropriately cascading plural disk pool connection units 61. It is therefore possible to freely change the number of connected disk array controllers 20, file servers 30, and JBOD enclosures 140 in the configuration. System scalability and the freedom of system configuration design are thus significantly improved.

When a fibre channel is used for the connection interface between the disk pool 4 and disk pool connection unit 61, the disk pool connection unit 61 can be a switch with a star network configuration connected to any two connection ports, or a hub to which all connection ports are connected in a loop. The user can select the hub and switch according to the cost and required data transfer bandwidth. This embodiment is described without specifying whether a hub or a switch is used for the disk pool connection units 61.

Figure 6:
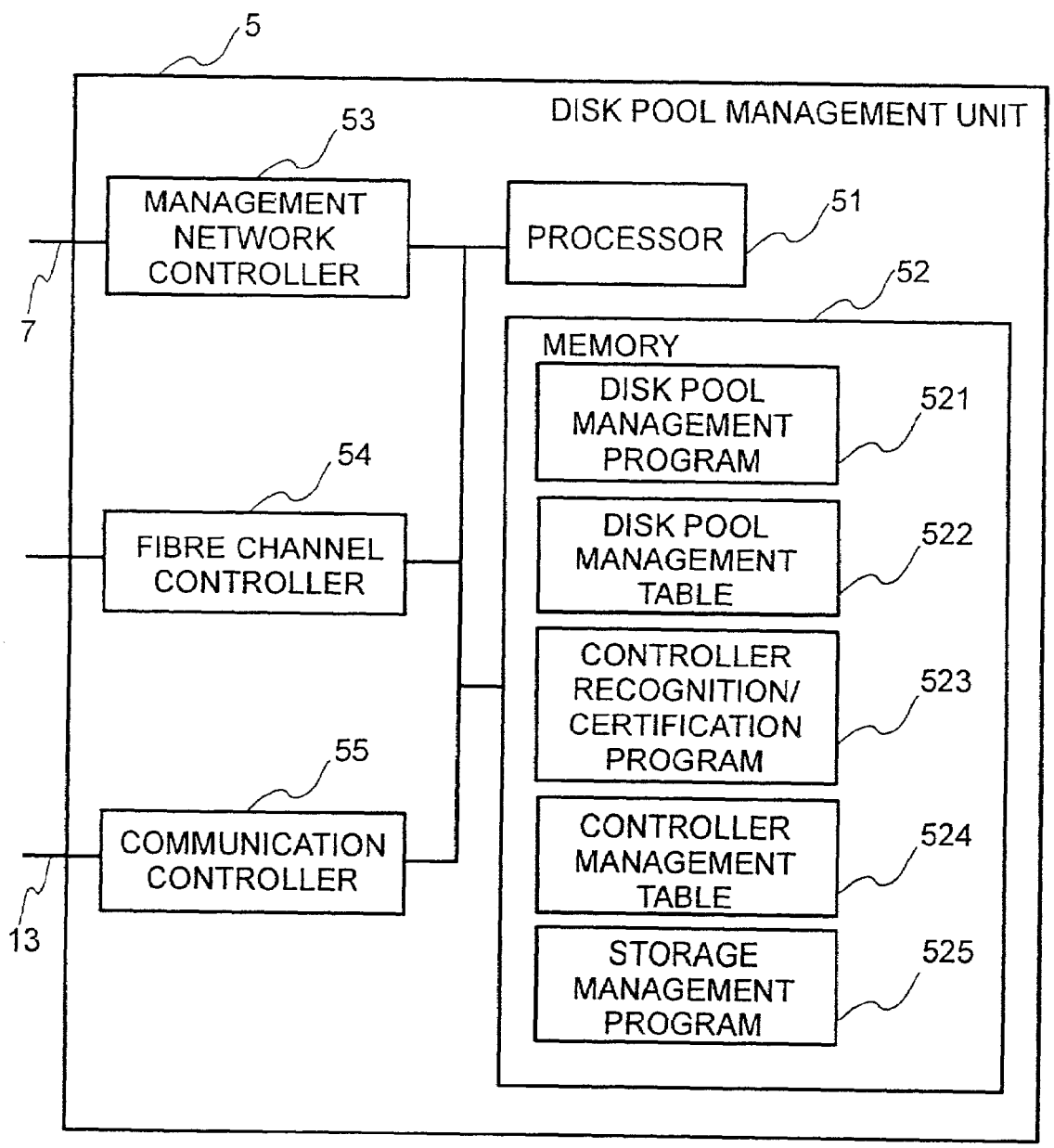
FIG. 6 is a simplified block diagram showing the configuration of a disk pool management unit.

FIG. 6 is a simplified block diagram showing the configuration of a disk pool management unit 5.

The disk pool management unit 5 has a processor 51 providing overall control of the management unit, memory 52 for storing control data used by and the control program run by the processor 51, a management network controller 53 for connecting to the management network 7, a fibre channel controller 54 for connecting to the disk pool 4 via a fibre channel, and a communication controller 55 for connecting to the management LAN 13.

The memory 52 stores a disk pool management program 521 as the control program for managing the disk pool 4, a controller recognition/certification program 523 for recognizing and certifying the disk array controllers 20 and file servers 30 (together referred to below as the controllers), and a storage management program 525 for managing the storage 1. The disk pool management program 521 more specifically detects the disk drive units 41 of the disk pool 4 and exclusively controls the disk drive units 41 assigned to the controller.

Control data stored in memory 52 includes a disk pool management table 522 holding the information for managing allocation of disk drive units 41 to the controllers, and a controller management table 524 holding the controller management information detected by the controller recognition/certification program 523.

A storage management console 12 connected to the disk pool management unit 5 through the management LAN 13 has a display for presenting information to the user, and I/O devices such as a keyboard and mouse for receiving input from the user. A browser program runs on the storage management console 12. The browser program is used to present information to the user by the storage management program 525 running on the disk pool management unit 5, and to input information to the storage management program 525.

Figure 7:
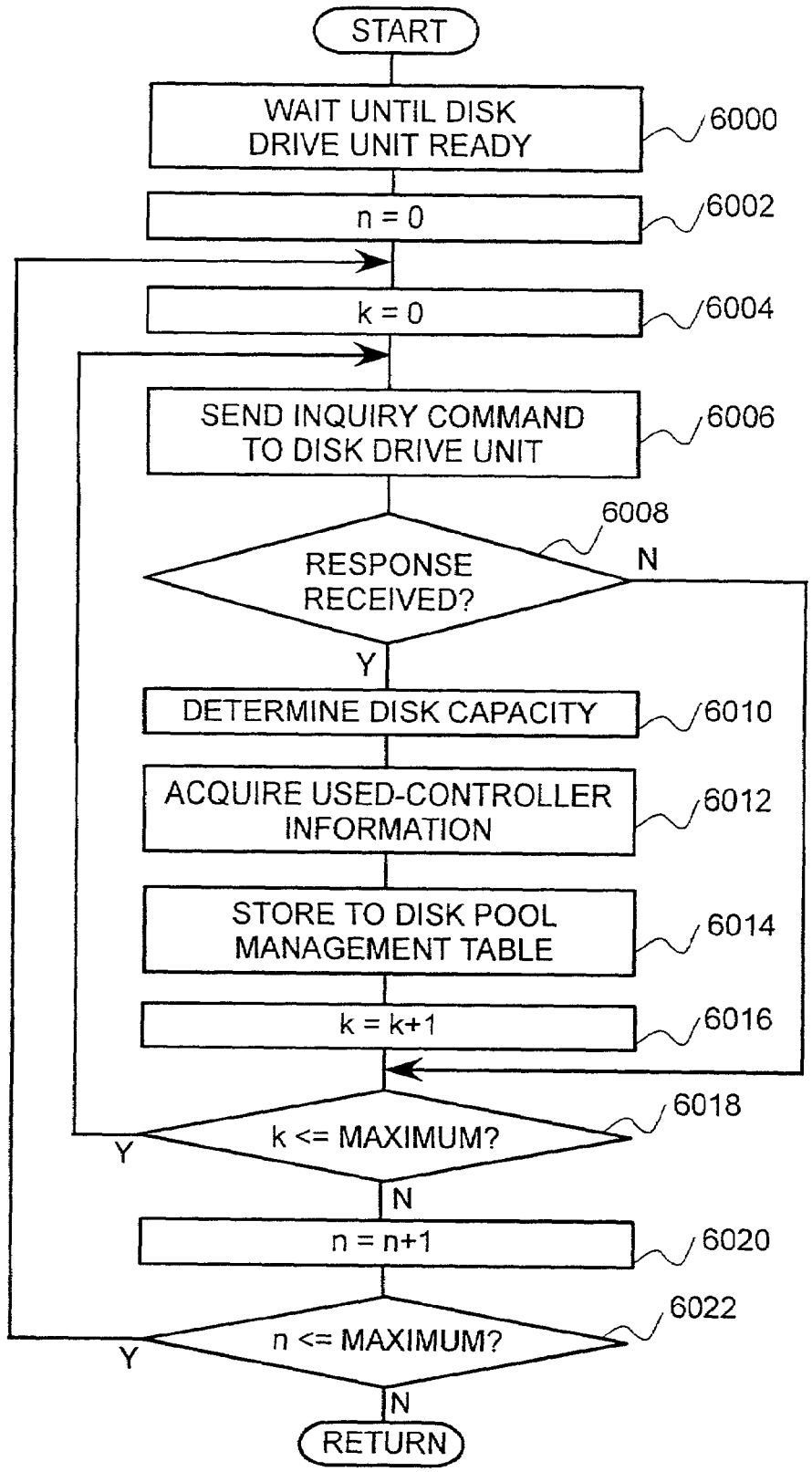
FIG. 7 is a flow chart of the disk pool configuration recognition process achieved by the disk pool management program.

FIG. 7 is a flow chart of the disk pool configuration recognition process achieved by the disk pool management program 521. The processor 51 starts running the disk pool management program 521 when the user turns the storage 1 power on or resets the storage 1.

When the disk pool management program 521 starts, the processor 51 waits an appropriate time until all disk drive units 41 enter a ready state (step 6000).

After waiting an appropriate time, the processor 51 initializes a variable n to 0 where this variable n indicates the path ID to search. The path ID is an identifier for identifying the JBOD enclosure 140 or loop to which a disk drive unit 41 is connected. The path ID as used herein is a number assigned to a loop or JBOD enclosure 140, or a World Wide Name (WWN) representing a loop connected to a switch (step 6002).

The processor 51 then initializes another variable k to 0 where k indicates an address on the path. Each path address is a number assigned to a particular disk drive unit 41 for identifying each disk drive unit 41 in each loop or JBOD enclosure 140. If the path is a loop, the address is equivalent to a loop ID (step 6004).

The processor 51 then issues an inquiry command to the disk pool 4 to detect a disk drive unit 41 at address=k on path ID=n (step 6006). The processor 51 then detects a response to the inquiry command from the disk pool 4. If no response is received from the disk pool 4, the processor 51 determines that there is no disk drive unit 41 at path ID=n, address=k, and advances to step 6016 to look for the next disk drive unit 41 (step 6008).

If a response is received from the disk pool 4, the processor 51 acquires disk capacity and other information from the disk drive unit 41 at address k on path ID n (step 6010). Next, the processor 51 sends a read command to the disk drive unit 41 from which the capacity data was acquired in step 6010. This read command is a command to read from a specific area of the disk drive unit 41. Information about the controller using that disk drive unit 41 (referred to below as the controller information) is stored to this specific area. The controller information could be the controller number assigned to a particular controller in the system, a controller identification number assigned to the controller at the time of manufacture, the controller type, or other information. In response to the read command the processor 51 is thus able to acquire information identifying the controller using that disk drive unit 41. If controller information is not recorded to this specific area, the processor 51 knows that the disk drive unit 41 is not used (step 6012).

After acquiring the capacity and controller information for the disk drive unit (or information identifying the disk drive unit as not used if that is the case), the processor 51 registers this information in the disk pool management table 522 together with the path ID and address (step 6014).

At step 6016 the processor 51 increments address variable k by 1 to the next address, and then detects if k is greater than the highest address on the path. If k is within the address range of the path, the processor 51 loops back to step 6006 and looks for another disk drive unit 41 on the same path (step 6018).

When k is greater than the highest address value on the path and the processor 51 has checked for a disk drive unit 41 at every address on the path, the processor 51 increments the path ID variable n by 1 to search the next path (step 6020). It then detects whether n is greater than the highest path ID. If path ID n is within the path ID range, processor 51 loops back to step 6004 and starts looking for disk drive units 41 on the path at the next path ID (step 6022).

If n is greater than the highest path ID in step 6022, all paths have been searched and the processor 51 ends the initialization process.

As described above, the path ID n and address k values are numbers in a particular range that are increased sequentially from 0 to search all addresses on all paths in this embodiment of the invention. However, another search method can be used if all addresses where a disk drive unit 41 might be located can be searched without searching too much or too little.

FIG. 8 shows the conceptual structure of the disk pool management table 522.

For each disk drive unit detected in the initialization process, the disk pool management table 522 stores the path ID 5201, address 5202, disk capacity 5203, assigned controller identity number 5204, and disk drive unit status 5205.

The assigned controller identity number 5204 is the identification number of the controller to which the disk drive unit 41 identified at path ID 5201 and address 5202 is allocated. If the disk drive unit 41 has not been allocated and is in an unused status, the assigned controller identity number 5204 is blank or set to a value indicating its unused status.

Figure 9:
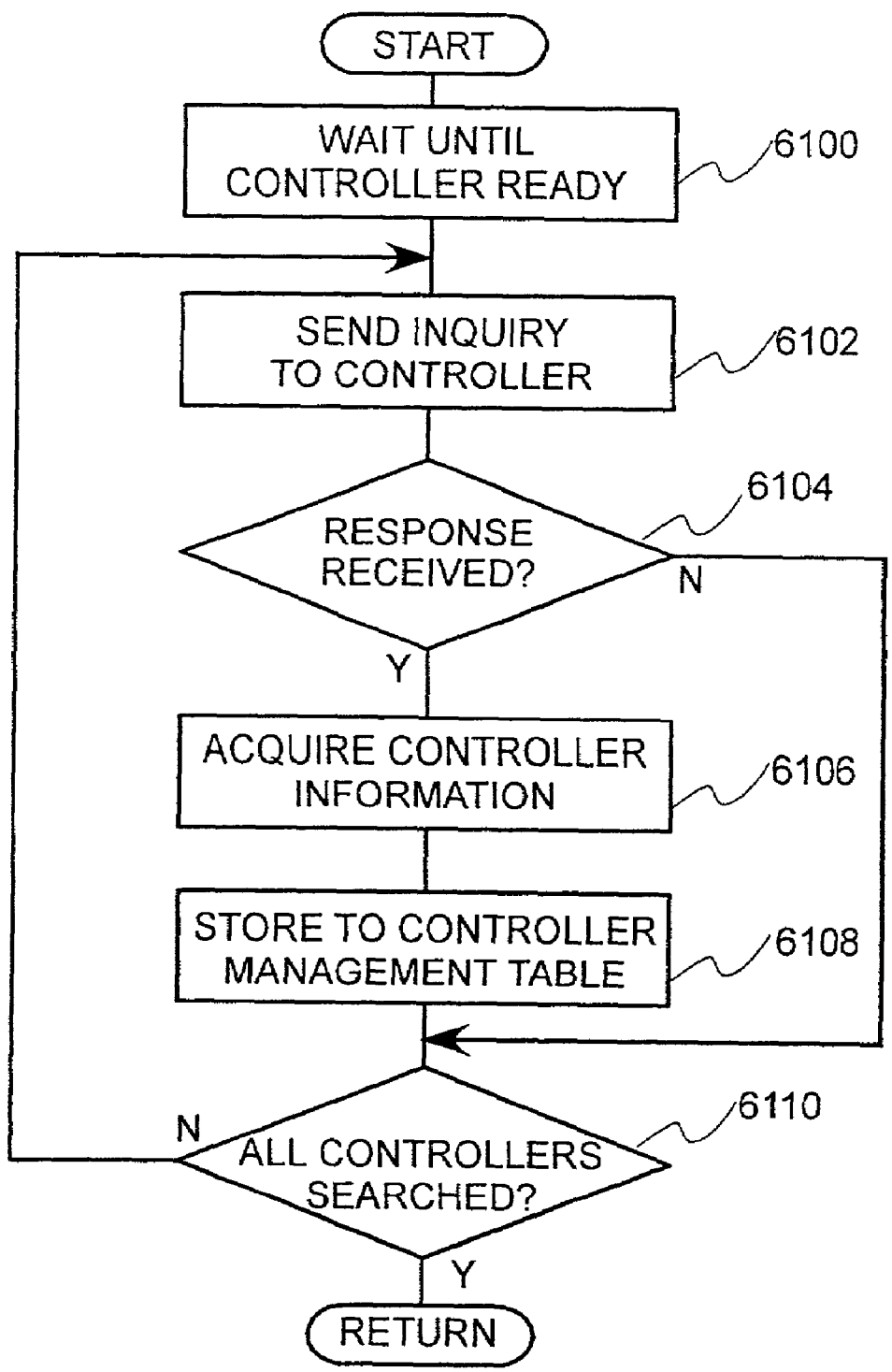
FIG. 9 is a flow chart of the controller recognition process achieved by the controller recognition and certification program.

FIG. 9 is a flow chart of the controller recognition process run by the controller recognition/certification program 523. The controller recognition process follows the disk pool configuration recognition process. The controller recognition process is also run when a new controller is added. An address for controller management is preassigned to each controller. A MAC address or IP address can be used for this address when the management network is a typical LAN.

When the processor 51 starts running the controller recognition/certification program 523, it first waits an appropriate time for all controllers to enter the ready state (step 6100). After waiting an appropriate time, the processor 51 specifies an address and sends an inquiry to the controller via the management network 7 (step 6102).

The processor 51 then detects a response to the inquiry (step 6104). If a response is received from the controller, the processor 51 acquires the controller number, controller type, and status information for the controller. This controller type information identifies whether the controller is a disk array controller 20 or file server 30. Status information indicates whether the controller status is normal or whether a problem or error occurred (step 6106). The processor 51 then registers the acquired information in the controller management table 524 (step 6108).

Finally, the processor 51 determines if all controllers have been searched. This can be accomplished by, for example, determining whether the above process has been run for every address in a predetermined address range. If controller searching is not finished, the process repeats from step 6102 to look for the next controller. When all controllers have been checked, the processor 51 ends the controller recognition process (step 6110).

If a response is not received from the controller in step 6104, the processor 51 determines that a controller does not exist at the polled address, skips steps 6106 and 6108, and proceeds from step 6110.

It should be noted that the controller address can be assigned automatically by loading a controller to a slot in the rack 15. Each controller number must also be unique within the system. More specifically, the controller numbers are preferably a number, such as the manufacturer serial number, uniquely assigned to each controller.

FIG. 10 shows the conceptual structure of the controller management table 524.

The controller management table 524 stores the detected address 5241 of the controller on the management network 7, and the assigned controller identity number 5242, controller type 5243, and status 5244 information acquired in step 6106.

When the storage 1 power is turned on, each controller (disk array controllers 20 and file servers 30) starts the respective control program (disk array control program 2020 and file server control program 3020) and auto-initializes.

Figure 11:
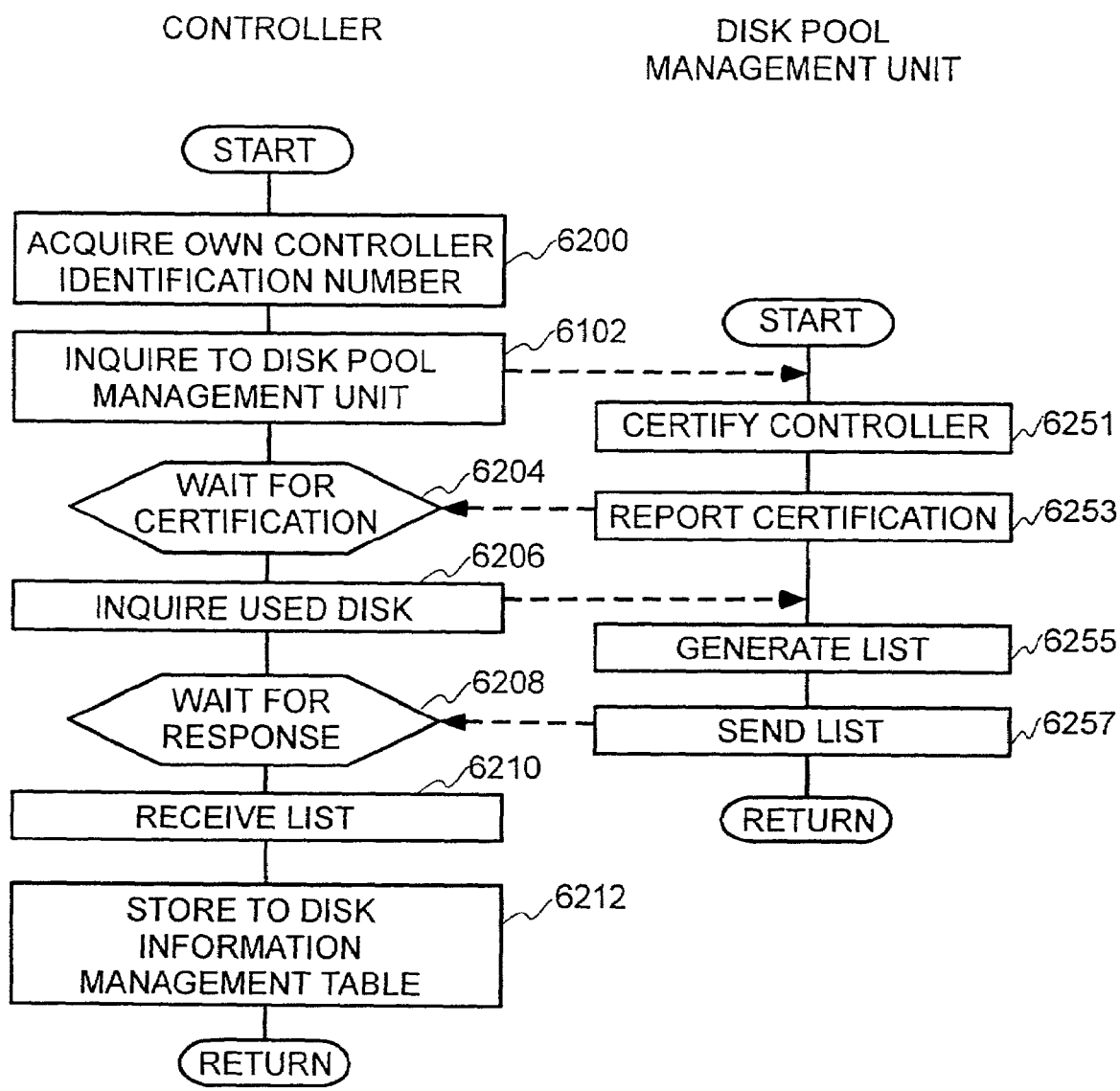
FIG. 11 is a flow chart of a disk recognition process.

After initialization is completed, each controller runs the disk information acquiring program 2021, 3021 to acquire information about the disk drive units usable by each controller. FIG. 11 is a general flow chart for this disk recognition process. Note that controller operations are shown on the left and disk pool management unit operations are shown on the right in FIG. 11. The process run by a disk array controller 20 is described next below, but it will be obvious that the file servers 30 run the same process.

The processor 201 first acquires the identification number of the controller in which it is used (step 6200). Using this identification number, the processor 201 sends a certification inquiry to the disk pool management unit 5 over the management network 7 (step 6202). After sending the inquiry, the processor 201 pauses the process until certification by the disk pool management unit 5 is completed (step 6204).

The processor 51 of the disk pool management unit 5 that received the inquiry starts the controller recognition/certification program 523 and runs the recognition process. During the recognition process the processor 51 confirms whether information for the disk array controller 20 from which the inquiry was received is registered in the controller management table 524 and certifies the controller (step 6251). If the processor 51 is already running the recognition process for other controllers, processing the inquiry is delayed until processing all of the other controllers is completed. If it is confirmed that information for the inquiring disk array controller 20 is registered in the controller management table 524, the processor 51 returns information indicating that certification was successful to the inquiring disk array controller 20 (step 6253).

In order to identify the disk drive units 41 that can be used by the controller, the processor 201 of the disk array controller 20 that received the information indicating that certification was successful sends a usable disk inquiry including the controller identification number to the disk pool management unit 5. This inquiry is sent through the management network 7 (step 6206). The processor 201 then pauses the process until a reply to the usable disk inquiry is received (step 6208).

The processor 51 receiving this inquiry then runs the disk pool management program 521 to process the inquiry. More specifically, the processor 51 searches the disk pool management table 522 using the identification number in the inquiry as the search key to identify the disk drive units 41 that can be used by the inquiring controller. The processor 51 then creates a list containing the path ID, address, disk capacity, and status information for the specified disk drive unit 41 (step 6255), and sends the list to the controller that sent the inquiry (step 6257).

The processor 201 thus receives the requested usable disk information from the disk pool management unit 5 in a list format (step 6210). Based on the information in the received list, the processor 201 registers information about the usable disk drive units 41 in the disk information management table 2022, and then ends the process (step 6212).

Having acquired the usable disk information, the disk array controller 20 or file server 30 recognizes all disk drive units 41 registered in the disk information management table 2022, 3022 as disk drive units that can be used by the respective controller, and thus uses those disk drive units 41. Each controller is therefore able to exclusively use selected disk drive units 41 in a single disk pool 4.

It should be noted that the disk pool configuration recognition process of the disk pool management unit and the initialization processes of the controllers can run simultaneously in parallel. On the other hand, the timing of the controller recognition process run by the disk pool management unit after these processes and the disk information acquiring processes of the controllers must be matched. In other words, the disk pool management unit and the controllers must time the operation of their respective processes so that the disk information acquiring processes of the controllers run after the controller recognition process of the disk pool management unit.

Figure 12:
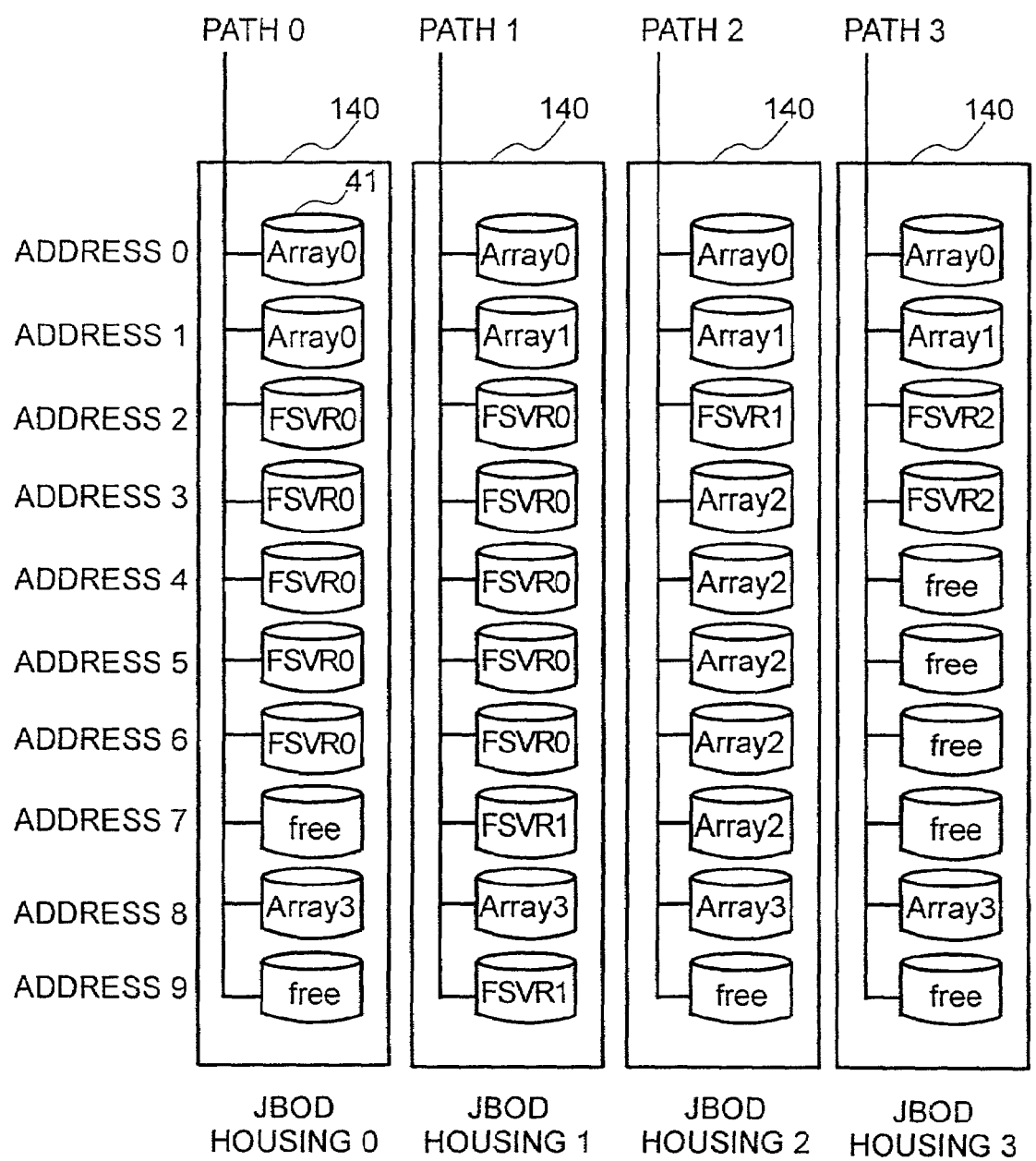
FIG. 12 is a schematic illustration of an exemplary allocation of disk drive units in the disk pool to the controllers.
Figure 13:
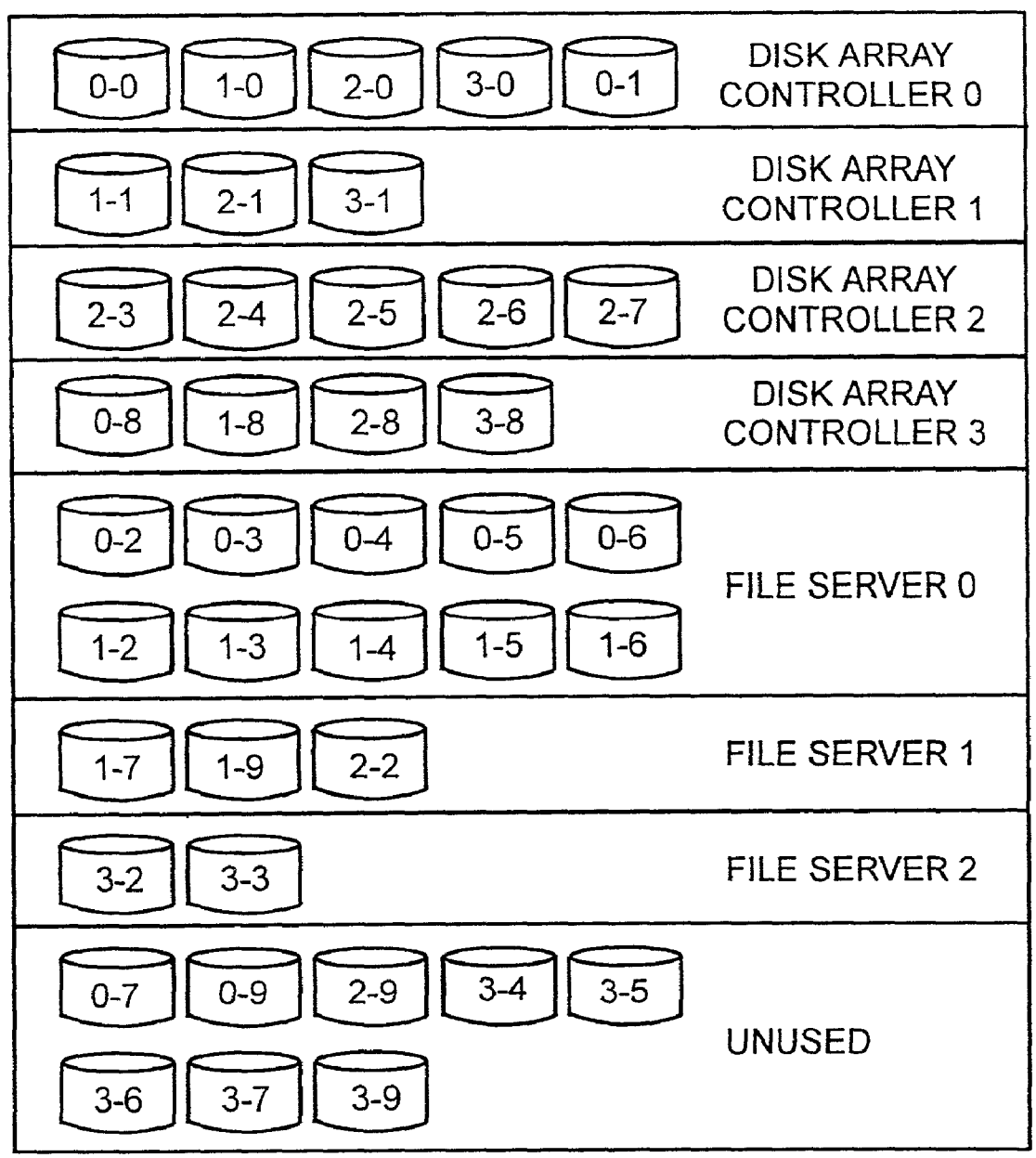
FIG. 13 shows the logical organization by controller of the disk drive unit allocation shown in FIG. 12.

FIG. 12 is a schematic diagram of the allocation of disk drive units 41 in the disk pool 4 to the controllers. FIG. 13 shows the allocations shown in FIG. 12 logically arranged by controller. Forty disk drive units 41 are allocated for exclusive use by the controllers in this example.

Referring to FIG. 12, the "Array #" in each symbol representing a disk drive unit 41 indicates that the disk drive unit 41 is assigned to the #-th disk array controller 20. Likewise, "FSVR#" indicates that the disk drive unit 41 is assigned to the #-th file server 30.

In FIG. 13, the value "n-k" in each symbol representing a disk drive unit 41 indicates that the disk drive unit is the disk drive unit at address k on path ID n.

When a new disk drive unit 41 is allocated to a controller, the user runs the storage management program 525 on the disk pool management unit 5 using the storage management console 12. The storage management program 525 displays a logical configuration of the disk pool 4 such as shown in FIG. 13, for example, on the display of the storage management console 12.

Using a mouse, the user then drags the icon of a disk drive unit in an area on the screen shown as being unused to the area of the controller to which the disk drive unit 41 is to be added.

The disk pool management unit 5 receiving the disk drive unit 41 allocation information as a result of the user's manipulation of the storage management console 12 then runs the disk pool management program 521 as follows.

That is, the disk pool management unit 5 writes the identification number of the controller corresponding to the area to which the icon was moved to a specified memory area of the disk drive unit 41 corresponding to the icon that was moved on the display of the storage management console 12. The disk pool management unit 5 then issues an inquiry command to the disk drive unit 41, and registers the information received in response to the disk pool management table 522. The disk pool management unit 5 notifies the controller via the management network 7 that the disk drive unit 41 is additionally available to the controller.

When this notice that the disk drive unit 41 is additionally available is received from the disk pool management unit 5, the controller runs the disk information acquiring process described above to identify the disk drive unit 41 so that the controller can use the disk drive unit 41.

It will be apparent that with a storage system comprised as described above a plurality of disk array controllers and a plurality of file servers can coexist in a single storage system, and a storage system combining both a SAN and NAS system can be provided. The storage system can be managed from a central management console, thereby making management easier and reducing management cost.

When both a SAN and NAS system is used it is often easier to think of a set of numerous small capacity storage devices than a single large capacity storage device logically grouping storage devices connected via a SAN. For example, when a single file server is used for each department of a company, it may be desirable to allocate an independent disk array to each server computer. There are also situations where it may be desirable to exclusively allocate a storage system to a particular user or computer, such as when providing a hosting service or rental server system in an Internet data center (IDC), or a storage service provider (SSP) providing a service for renting disk capacity. Such needs can be met using the embodiment described below for logically segmenting a single storage system and exclusively allocating segments to a particular user.

Figure 14:
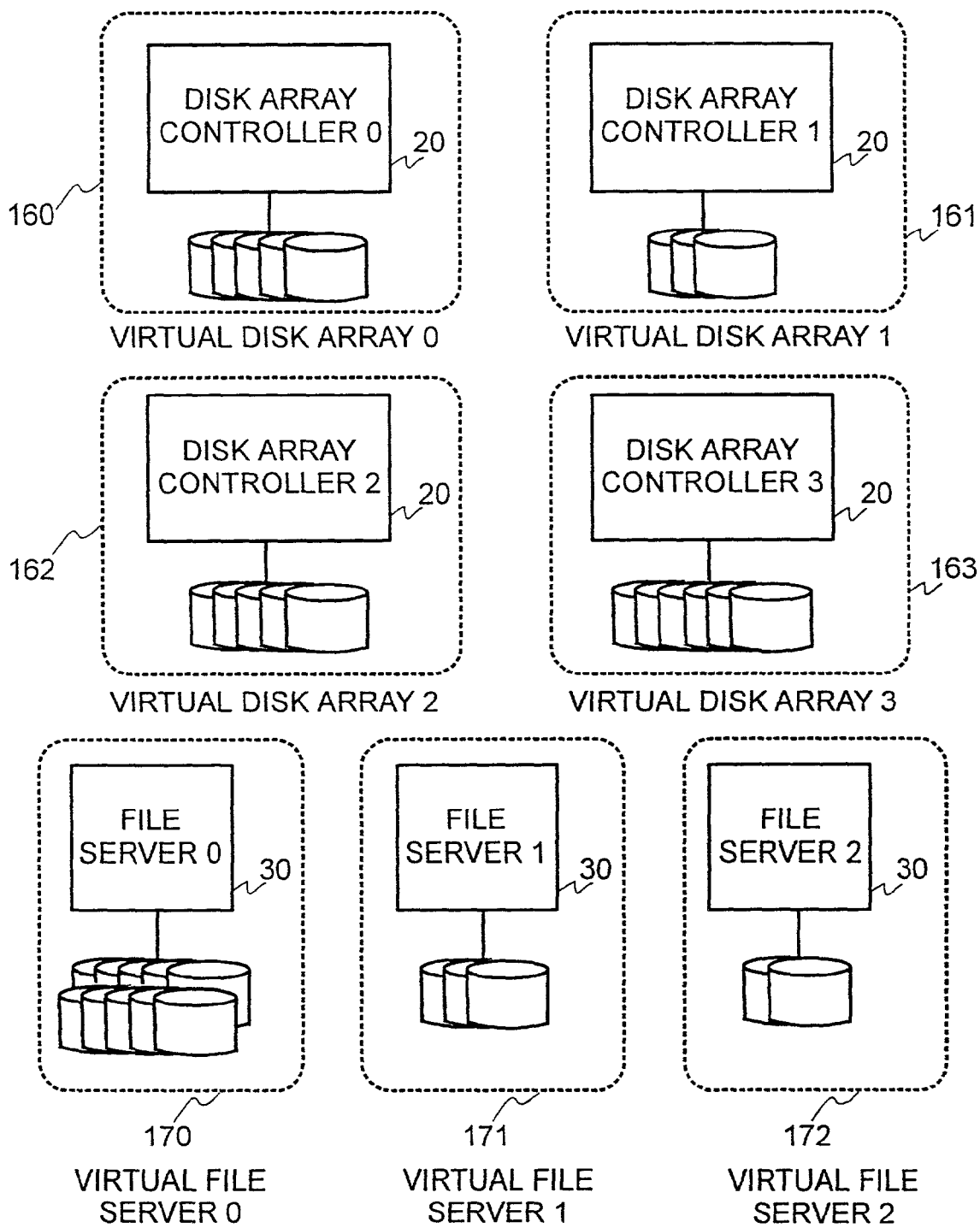
FIG. 14 schematically shows an exemplary deployment of system resources when the disk pool is logically divided for deployment.

FIG. 14 is a schematic illustration of a logical segmentation of a disk pool 4.

Shown in FIG. 14 are virtual disk arrays 160 to 163 and virtual file servers 170 to 172. Each virtual disk array is a logical disk array segment of the disk pool 4 controlled by a disk array controller 20. Each virtual file server is a logical disk array segment of the disk pool 4 controlled by a file server 30.

The disk pool management unit 5 handles allocation and exclusive management of the disk drive units 41. However, once a disk drive unit 41 is allocated to a controller, the controller can occupy the allocated disk drive unit 41 in the same way as a conventional disk array or file server.

It will be known from the preceding description that the present invention provides a storage system in which disk arrays with a SAN, that is, block I/O interface, and file servers with a NAS system, that is, file I/O interface, coexist.

Excess overhead is not created when the file servers are used and high speed file access can therefore be achieved because the disks connect directly to the file servers. In addition, because the file servers directly control the disks, file allocation can be optimized to enable even faster file access.

It is also possible with the above described embodiment to easily add as many disk array controllers, file servers, and disk drive units as needed when needed. It is therefore possible to expand as necessary those parts that are needed, thus providing a low cost storage system providing excellent scalability and freedom in configuring the system.

Furthermore, easy use is provided while also reducing management costs because the disk drive units that are used can be exclusively controlled while sharing a single disk pool through SAN and NAS system interfaces, enabling centralized management of a distributed system.

Yet further, because the plural SAN and NAS systems can be virtually presented as though they are discrete, a central managed distributed environment of independent users and computers can be achieved.

It will be further noted that a disk pool management unit is disposed to the storage system of this embodiment to allocate the disk drive units that can be used by each controller with exclusive use managed by the disk pool management unit. This central management configuration can also be modified to distribute disk pool management to each controller.

When disk pool management is thus distributed, the identification number of the controller that can use each disk drive unit is stored to a specific area of the disk drive unit as in the above preferred embodiment. When distributed management is used all controllers search the specific area of all disk drive units instead of the disk pool management unit first reading this information before allocating a disk drive unit to a controller. When a controller detects its own identification number, it recognizes that disk drive unit as one can that it can use.

When a new disk drive unit is installed, the user can store the identification information using the storage management program provided for each controller.

The above described configuration makes a disk pool management unit unnecessary, and thus enables further downsizing and cost reduction.

What is claimed is:

1. A storage system comprising:
   a plurality of disk drive units;
   a disk controller for accepting a first access request from a first computer through a block I/O interface, and for controlling access to said disk drive units through said block I/O interface, wherein said first computer is a storage area network (SAN) client;
   a file server for accepting a second access request from a second computer through a file I/O interface, and for controlling access to said disk drive units through said file I/O interface, wherein said second computer is a network-attached storage (NAS) client;
   a connection unit connected among said disk controller, said file server and said plurality of disk drive units for connecting said disk controller and said file server to said plurality of disk drive units; and
   a management unit connected to said disk controller and said file server by a network, wherein said management unit sends the first information to said disk controller and sends the second information to said file server via the network,
   wherein said disk controller comprises a memory for storing a first information indicating one or more of said plurality of disk drive units to which said disk controller is permitted to access and said disk controller accesses the one or more of said plurality of disk drive units based on said first information;
   wherein said file server comprises a memory for storing a second information indicating one or more of said plurality of disk drive units to which said file server is permitted to access and said file server accesses the one or more of said plurality of disk drive units based on said second information;
   wherein said first and second information includes address information and capacity information of said plurality of disk drive units; and
   wherein said management unit checks whether said disk controller and said file server exist before sending the first and second information.

2. A storage system according to claim 1, wherein said disk controller sends a first request for sending the first information to the management unit, and
   wherein said file server sends a second request for sending said second information to the management unit.

3. A storage system according to claim 2, wherein said plurality of disk drive units is divided into a plurality of groups,
   wherein a first of the plurality of groups is assigned to said file server and a second of the plurality of groups is assigned to said disk controller exclusively.

4. A storage system according to claim 1, further comprising a means for providing a virtual file server and a virtual disk array to the computer.

5. A storage system according to claim 4, wherein the plurality of groups includes a group which is not assigned to said file server and said disk controller.

6. A storage system according to claim 5, wherein said management unit sends a third information to said file server when one of the plurality of disk drive units included in the group is assigned to said file server, and
   wherein said file server modifies the second information based on said third information and accesses one of the plurality of disk drive units based on said modified second information.

7. A storage system according to claim 5, wherein said management unit sends a fourth information to said disk controller when a one of the plurality of disk drive units included in the group is assigned to said disk controller, and
   wherein said disk controller modifies the first information based on said fourth information and accesses one of the plurality of disk drive units based on said modified first information.

* * * * *